Nov. 14, 1967  R. KURZ ET AL  3,352,580
ADJUSTABLE JOINT
Filed April 27, 1965  3 Sheets-Sheet 1

Inventors

Nov. 14, 1967 R. KURZ ET AL 3,352,580
ADJUSTABLE JOINT
Filed April 27, 1965 3 Sheets-Sheet 2

Inventors

Nov. 14, 1967   R. KURZ ET AL   3,352,580
ADJUSTABLE JOINT

Filed April 27, 1965   3 Sheets-Sheet 3

Inventors

United States Patent Office 3,352,580
Patented Nov. 14, 1967

3,352,580
ADJUSTABLE JOINT
Rudolf Kurz, deceased, late of Bietigheim-Bissingen, Germany, by Helene Kurz, legal guardian of minor heir, Bietigheim-Bissingen, Germany, Walter Neubert, Bissingen, Germany, and Helmut Lechler, Heutingsheim, Germany; said Neubert and said Lechler assignors to Rudolf Kurz, a minor and son of said Rudolf Kurz, deceased
Filed Apr. 27, 1965, Ser. No. 451,357
19 Claims. (Cl. 287—14)

ABSTRACT OF THE DISCLOSURE

An adjustable joint between two pivotably connected parts of collapsible furniture or the like wherein one of the parts carries a ratchet and the other part carries a first pawl whose pallet or pallets can enter the spaces between the ratchet teeth. The first pawl carries a second pawl whose pallet enters another tooth space when the two parts are held against relative movement in one direction. The pallet of the second pawl rides over the ratchet teeth when the parts are caused to carry out relative movement in the other direction whereby the second pawl disengages the first pawl from the ratchet.

---

The present invention relates to an adjustable joint. More particularly, the invention relates to improvements in an adjustable joint of the type which may be utilized, among others, to couple relatively movable parts in collapsible chairs or other pieces of indoor or outdoor furniture.

It is an important object of the present invention to provide an adjustable joint between a pair of pivotally interconnected members which is constructed and assembled in such a way that the angular position of one member with reference to the other member may be changed in either direction and solely in response to suitable manipulation of the one member, i.e., without necessitating manual disengagement or reengagement of the mechanism which constitutes the joint.

Another object of the invention is to provide an adjustable joint which is particularly suited to allow for changes in the inclination of a back support with reference to the seat portion of a collapsible chair, folding bed or the like.

A further object of the invention is to provide an adjustable joint of the just outlined characteristics which may be manipulated by skilled or unskilled persons, which can be manipulated by exertion of an minimal force, and which can withstand substantial stresses such as will arise, for example, when the joint is embodied in a collapsible chair intended to be occupied by a corpulent person or by two or more persons at a time.

An additional object of the present invention is to provide an adjustable joint which comprises a small number of simple, inexpensive and rugged parts, which allows for complete collapsing of the structure in which it is installed, and which can be readily installed in many existing types of chairs, beds and similar structures.

A concomitant object of the invention is to provide the improved adjustable joint with a novel control element which enables the operator to lock the relatively movable parts of a chair or the like in a large number of different angular positions and which allows for adjustments in such angular positions merely in response to proper manipulation of interconnected members.

Still another object of the present invention is to provide an adjustable joint which may be installed at the junction of three or more relatively movable members in a collapsible chair or the like.

Briefly stated, one feature of the present invention resides in the provision of an adjustable joint, particularly for use in collapsible or foldable chairs and other pieces of indoor or outdoor furniture. In one of its preferred forms, the joint comprises a pair of pivotally connected braces, arms, legs or similar members, a ratchet rigid with the first member and comprising a plurality of ratchet teeth separated from each other by tooth spaces located at the same distance from the pivot axis between the two members, a pawl pivotally secured to the second member and comprising a pallet which is normally received in one of the tooth spaces to lock one of the members against pivotal movement in one direction (e.g., in a clockwise direction), a control element in the form of a tongue or the like pivotally mounted on the pawl and normally extending in another tooth space which is adjacent to the one tooth space, and resilient means mounted on the second member for biasing the pallet and the control element into the respective tooth spaces and for simultaneously biasing the tip of the control element in a direction toward the tip of the pallet. The pivot axes of the pawl and control element are parallel with the pivot axis of the two interconnected members and the pallet is shorter than the control element so that the ratchet teeth bypass the pallet when the one member is pivoted in a counterclockwise direction to withdraw the pallet from its tooth space and to allow the tip of the control element to pivot toward the tip of the pallet. In the next step, the one member is pivoted in a clockwise direction in order to locate a first newly selected tooth space in registry with the pallet whereby the tip of the control element enters a second newly selected tooth space and engages that tooth which separates the newly selected tooth spaces. In the final step, the operator pivots that one member in a counterclockwise direction to move the tip of the control element away from the tip of the pallet by simultaneously compelling the pallet and the control element to enter fully the corresponding newly selected tooth spaces so that the one membr is automatically locked against pivotal movement in the clockwise direction and remains in its newly selected angular position.

The novel features which are considered as characteristic of the invention are set forth in particular in the appended claims. The improved adjustable joint itself, however, both as to its construction and its mode of operation, together with additional features and advantages thereof, will be best understood upon perusal of the following detailed description of a specific embodiment with reference to the accompanying drawings, in which:

Figure 1:
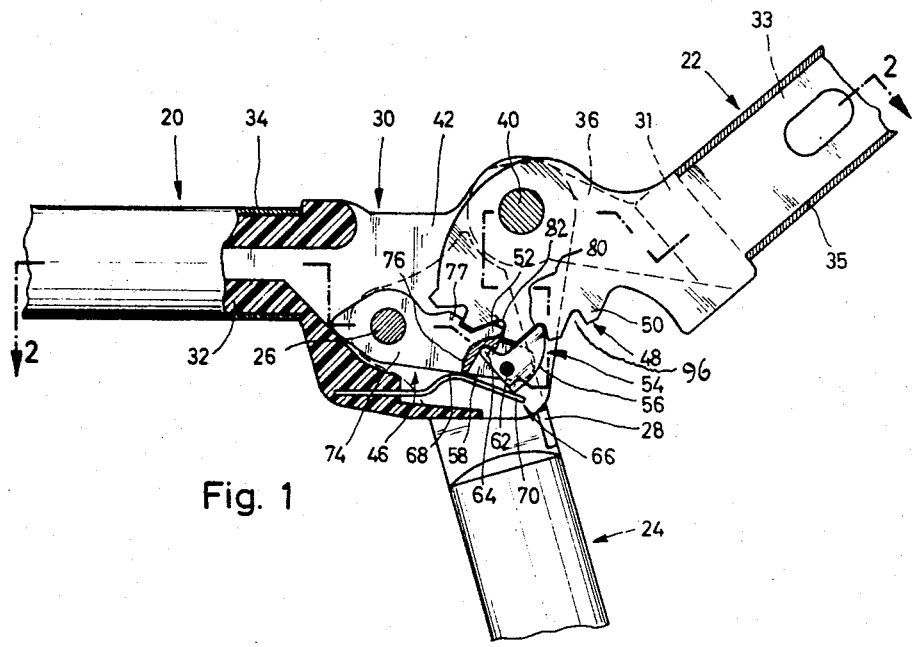
FIG. 1 is a vertical section through an adjustable joint which embodies the present invention, the pallet being shown in locking position.
Figure 2:
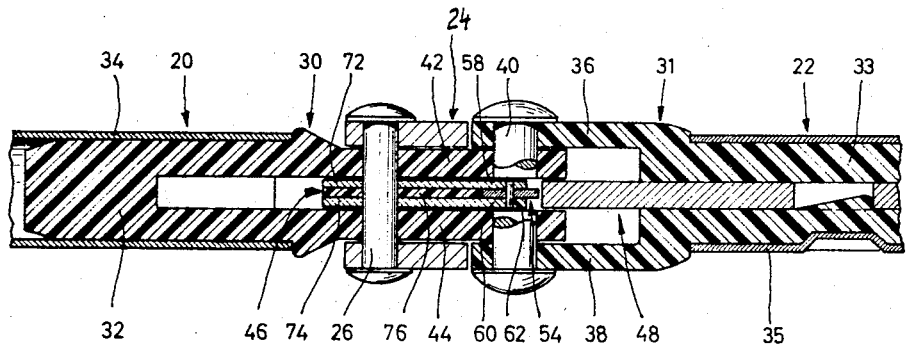
FIG. 2 is a horizontal section substantially as seen in the direction of arrows from the line 2—2 of FIG. 1.

Referring first to FIGS. 1 and 2, the adjustable joint of the present invention is shown as being installed at the junction of three brace-like members 20, 22, 24 forming part of a piece of outdoor or indoor furniture, for example, a foldable chair. The member 20 forms part of the seat proper, i.e., it surrounds that portion of the chair which actually supports the body of the user. The member 22 forms part of the back support and is pivotable with reference to the member 20 about a transverse horizontal axis defined by a pivot 40. The third member 24 constitutes one leg of the chair and is pivotable with reference to the members 20, 22 about a second transverse horizontal axis defined by a shaft 26. In the illustrated embodiment, the member 24 is pivotally secured to the member 20, i.e., the shaft 26 is mounted on the member 20. A projection 28 extends upwardly from the member 24 and abuts against a portion of the member 20 to keep the member 24 in the normal extended position. When the chair is to be collapsed, the member 24 is pivoted in a clockwise direction, as viewed in the drawings, and into substantial parallelism with the member 20.

The present invention is concerned with an adjustable joint between the members 20 and 22, and this joint serves to allow for adjustments in the angular position of the member 22 with reference to the members 20 and 24. The member 20 comprises a metallic tube 34 whose end portion carries an extension 32 made of rigid synthetic plastic material and having a bifurcated end portion consisting of parallel prongs 42, 44 located in vertical planes. The member 22 also comprises a metallic tube 35 whose end portion carries a second synthetic plastic extension 33 having a bifurcated end portion consisting of parallel prongs 36, 38 located in vertical planes and straddling the prongs 42, 44. The pivot 40 extends through the prongs 36, 38, 42, 44 and thus defines the aforementioned horizontal pivot axis around which the member 22 may swing in a clockwise or counterclockwise direction. As shown in FIG. 2, the upper end portion of the member 24 is also forked and its prongs straddle the prongs 42, 44 of the member 20. The shaft 26 extends through the upwardly extending prongs of the member 24 and through the prongs 42, 44 of the member 20 so that the member 24 may pivot about a second horizontal axis which is parallel to the axis of the pivot 40 but is located at a level therebelow.

The prongs 42, 44 of the member 20 accommodate between themselves the flat plate-like body of a pawl 46 which is pivotable on the shaft 26 and comprises at its free end an upwardly extending main pallet 52 adapted to cooperate with the teeth of a segment-shaped ratchet 48. The ratchet 48 is anchored in the member 22 and its blade-like rear end portion extends into a complementary recess of the extension 33, see FIG. 2. The pawl 46 and the ratchet 48 are located in the same vertical plane extending between the prongs 42, 44. The toothed portion of the ratchet 48 is indicated at 50. When the member 22 is locked against clockwise pivotal movement with reference to the member 20, the pallet 52 of the pawl 46 extends into one of the tooth spaces between the teeth of the ratchet 48. However, the member 22 may be readily pivoted in a counterclockwise direction, i.e., in a direction to move it nearer to a truly vertical plane. Such movement of the member 22 is normally opposed by gravity and by the weight of the person occupying the chair when the person leans back so that a portion of his or her weight rests on the member 22. The teeth of the ratchet 48 are equidistant from the pivot 40.

Figure 4:
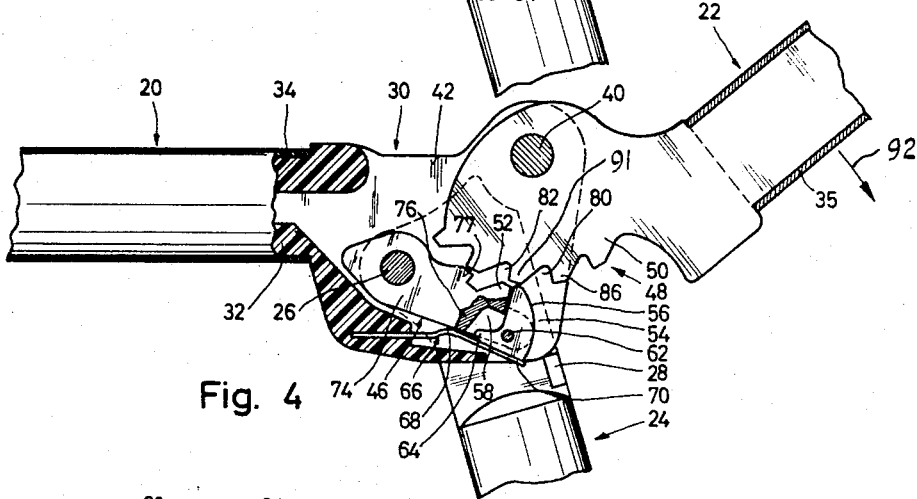
Figure 5:
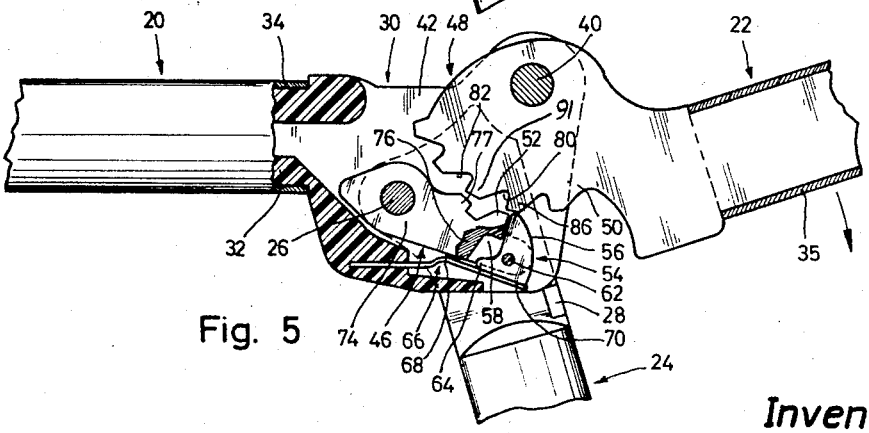

The joint of our invention further comprises resilient biasing means in the form of a leaf spring 66 and a control element in the form of a tongue 54. This control element (hereinafter called tongue for short) is a pawl which is pivotably mounted at the free end of the pawl 46 so that its pallet is outwardly adjacent to the pallet 52. In other words, the pallet 52 is located between the pallet of the tongue 54 and the shaft 26. The tongue 54 is provided with a convex cam face 56 which extends downwardly from the tip of its pallet and the width of this tongue diminishes gradually in a direction away from its pivot pin 62 which connects it to the pawl 46. The axis of the pin 62 is parallel to the axes of the pivot 40 and shaft 26. The tongue 54 may be pivoted on the pin 62 to and from the position shown in FIGS. 3–5 in which its cam face 56 constitutes an extension of the outer face of the pallet 52, i.e., the cam face 56 faces away from the pallet 52. However, the tip of the pallet on the tongue 54 then extends at least slightly beyond the tip or top land of the pallet 52. The pawl 46 comprises two parallel plate-like metallic walls 72, 74 (see FIG. 2) which are separated from each other by a median wall 76 of rigid synthetic plastic material and which provide room for the tongue 54. The right-hand end portions or prongs 58, 60 of the outer walls 72, 74 straddle a portion of the tongue 54 and serve as bearings for the ends of the pivot pin 62. The position of the pin 62 is selected in such a way that the tip of the pallet on the tongue 54 extends into a first tooth space between two adjoining teeth on the ratchet 48 when the pallet 52 extends into the adjacent tooth space, see FIG. 1. This applies when the angular position of the member 22 has been adjusted, i.e., when the member 22 is not moved about the axis of the pivot 40 and the chair is ready for use or is actually used.

The tongue 54 is provided with a projection or leg 64 which normally extends in a direction toward the shaft 26 and abuts against a stop shoulder of the pawl 46 to fix the tongue in selected angular position. The stop shoulder is defined by the median wall 76.

The leaf spring 66 is anchored in the extension 32 of the member 20 and comprises an upwardly arched median portion 68 which engages the underside of the pawl 46 and urges it to pivot in a counterclockwise direction as the parts appear in the drawings. The outer end portion 70 of the leaf spring 66 is straight and normally bears against a flat portion of the tongue 54 thus tending to turn the tongue in a counterclockwise direction, i.e., the tongue 54 tends to rotate about the pin 62 in a sense to move the projection 64 away from the stop shoulder on the median wall 76. This holds true when the tip of the pallet on the tongue 54 extends fully into a space between the teeth of the ratchet 48. It will be noted that the spring 66 by itself holds the pawl 46 and the tongue 54 in operative position.

The pawl 46 may but need not be provided with a rather short auxiliary pallet 77 which is adjacent to the main pallet 52 and enters a third space between the teeth of the ratchet 48 when the adjoining two spaces at one side thereof are respectively occupied by the pallet 52 and the pallet of the tongue 54. The function of the pallet 77 is to assist the main pallet 52 and to take up some of the stresses which would otherwise be borne solely by the main pallet. It is clear that the pawl 46 may be provided with two or more auxiliary pallets 77 or that it may comprise only the pallet 52.

Figure 7:
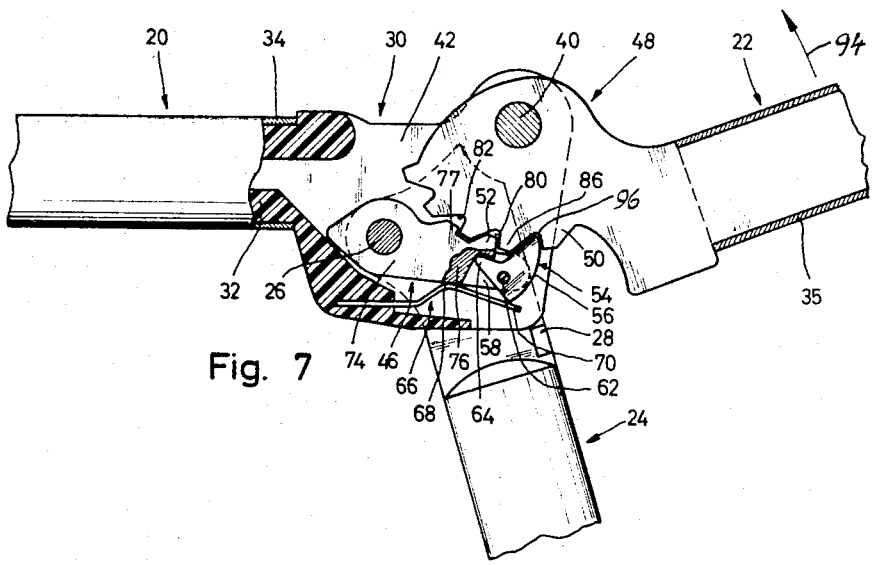
FIG. 7 is a vertical section through the joint subsequent to locking of its pivotable member in a different position.

The improved joint is manipulated as follows:

The user might decide to increase the inclination of the member 22 so that this member will be located nearer to a horizontal plane and will take the position shown in FIG. 7. In the first step, the member 22 is pivoted in a counterclockwise direction (see the arrow 90 in FIG. 3) to pivot the toothed portion 50 of the ratchet 48 in a sense that the pallet 52 leaves the bottom zone of the tooth space 82 and the tip on the pallet of the tongue 54 leaves the adjoining tooth space 80. The tooth 91 between the spaces 80, 82 then rides along the left-hand flank of the tongue 54 and the tip of this tongue enters the space 82. In order to allow for such angular displacement of the member 22, the tongue 54 must overcome the bias of the spring 66 by flexing the flat end portion 70 downwardly. However, as soon as the tip of the pallet on the tongue 54 moves beyond the top land of the tooth 91, the spring 66 immediately rocks the tongue in a counterclockwise direction and its end portion 70 then lies flat against the flat face of the projection 64. The member 22 has now reached the position of FIG. 3 and the cam face 56 of the tongue 54 constitutes a smooth continuation of the right-hand flank on the pallet 52.

Figure 6:
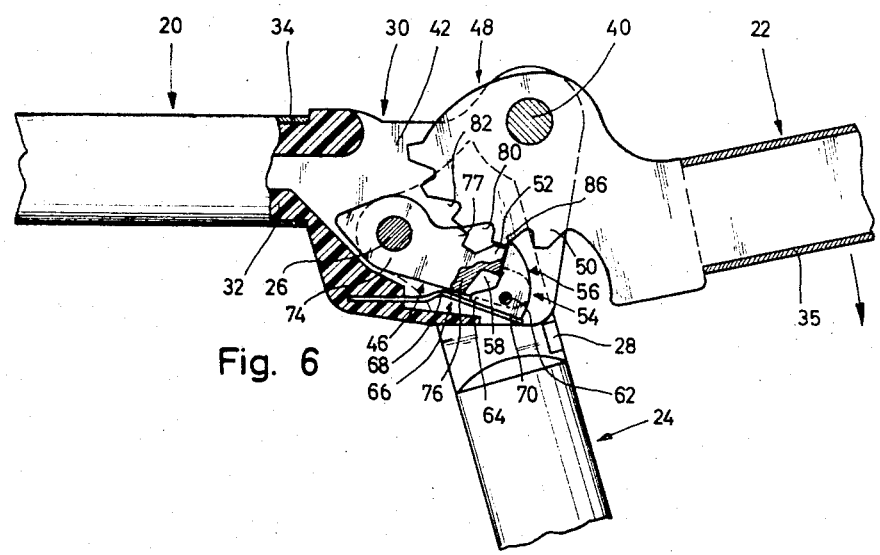

In the next step, the user pivots the member 22 in a clockwise direction (see the arrow 92 in FIG. 4) whereby the left-hand flank of the tooth 91 slides along the cam face 56 of the tongue 54 and causes the spring 66 to yield. Since the tip of the pallet on the tongue 54 extends beyond the tip of the pallet 52, the tooth 91 fully bypasses the pallet 52 and the remainder of the pawl 46. As the member 22 continues to pivot in a clockwise direction (FIG. 5), the tip of the pallet on the tongue travels along the right-hand flank of the tooth 91 and the cam face 56 is then engaged by the left-hand flank of the tooth 86 to cause repeated deflection of the spring 66 and resultant bypassing of the main pallet 52 by the top land of the tooth 86. Once the tip of the pallet on the tongue 54 engages the right-hand flank of the tooth 86 (FIG. 6), the user pivots the member 22 slightly in a counterclockwise direction (see the arrow 94 in FIG. 7), whereby the tongue 54 pivots about the pin 62 to change its angular position in a clockwise direction and to move the tip of its pallet away from the tip of the pallet 52. This means that the tongue 54 enters fully the tooth space 96 (FIG. 7) while the pallet 52 enters the tooth space 80 which, in FIG. 1, was occupied by the tongue. At the same time, the auxiliary pallet 77 enters the tooth space 82.

Figure 3:
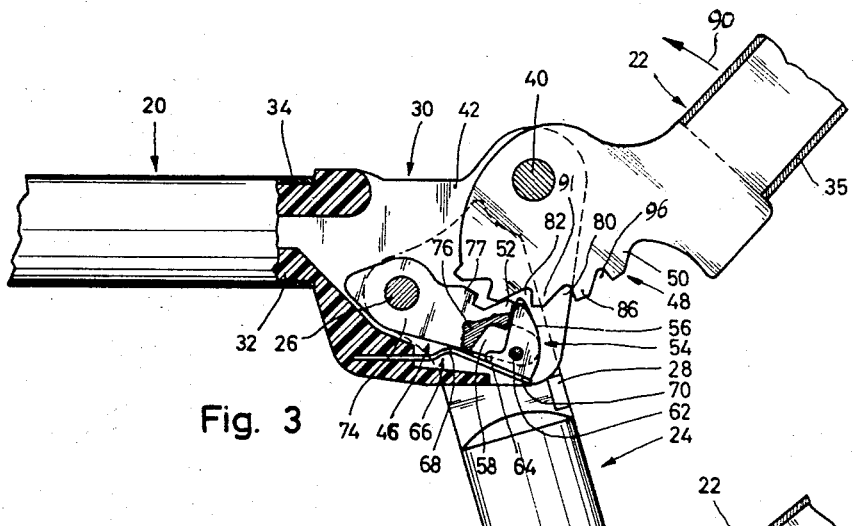
FIGS. 3 to 6 illustrate four intermediate positions of the joint during adjustment of the pivotable member to a different angular position, the joint being shown in vertical section similar to the one shown in FIG. 1.

It will be seen that the member 22 will be pivoted in a counterclockwise direction in order to withdraw the tongue 54 from its tooth space 80 and to simultaneously withdraw the main pallet 52 from the adjoining tooth space 82 whereby the tongue automatically pivots with reference to the main pallet and takes the position of FIG. 3, that the member 22 is thereupon pivoted in a clockwise direction until the tip of the pallet on the tongue 54 partially enters the newly selected tooth space 96 in the portion 50 of the ratchet 48, and that the member 22 is finally again pivoted in the counterclockwise direction in order to fully insert the tongue 54 and the main pallet 52 in their newly selected tooth spaces 96, 80 by changing the angular position of the main pallet and of the tongue with reference to each other.

The feature that the pallet 52 is shorter than the tongue 54 is of particular importance when the operator decides to change the inclination of the member 22 to such an extent that several teeth of the ratchet 48 must travel along the pallet 52 while the member 22 pivots in a clockwise direction. The tip of the pallet on the tongue 54 invariably keeps the pallet 52 away from the toothed portion 50 as long as the end portion 70 of the spring 66 lies flat against the tongue.

If desired, the tongue 54 may be pivotally connected to one side of the pawl 46. The thickness of the toothed portion 50 on the ratchet 48 is then increased to insure that the pallet 52 may enter one of the tooth spaces at the time the pallet of the tongue 54 has entered the adjoining tooth space of the portion 50. The solution shown in FIGS. 1 to 7 is normally preferred because the ratchet 48 may consist of comparatively thin, lightweight metallic sheet stock.

It is clear that the number of teeth on the ratchet 48 may be increased so that the member 22 can be locked in a large number of different angular positions. The provision of one or more auxiliary pallets 77 is of particular advantage when the ratchet 48 comprises a large number of comparatively small teeth because the stresses are then distributed among two or more pallets each of which engages a different tooth when the member 22 is locked against pivotal movement in a clockwise direction.

The extensions 32, 33 preferably consist of moldable plastic material because such material can be shaped to form various recesses, slots, prongs, collars, necks or similar configurations at a cost which is substantially below the cost of similarly shaped metallic parts.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the means and range of equivalence of the following claims.

What is claimed as new and desired to be secured by Letters Patent is:

1. An adjustable joint, comprising a first and a second member; pivot means connecting said members; a ratchet rigid with said first member and having teeth separated by tooth spaces; a pawl pivotally secured to said second member and having a pallet normally extending into one of said spaces to prevent pivotal movement of one of said members in one direction; a control element pivotally mounted on said pawl and normally extending into another tooth space, the pivot axes of said pawl and said control element being parallel with the axis of said pivot means; and resilient means mounted on said second member for biasing said pallet and said control element into the respective spaces.

2. An adjustable joint, comprising a first and a second member; pivot means connecting said members; a ratchet rigid with said first member and comprising a plurality of teeth separated by tooth spaces equidistant from said pivot means; a pawl pivotally secured to said second member and comprising a pallet having a tip, said pallet being normally received in one of said spaces to lock one of said members against pivoting in one direction; a tongue pivotally mounted on said pawl and having a tip, said tongue normally extending into another of said spaces and the pivot axes of said tongue and said pawl being parallel to said pivot means; and resilient means mounted on said second member for biasing said pallet and said tongue into the respective spaces and for simultaneously biasing the tip of said tongue toward the tip of said pallet so that said tongue pivots in response to pivoting of said one member in the other direction to withdraw said tips from the respective spaces, said tongue being longer than said pallet so that said teeth bypass the pallet when said one member is subsequently pivoted in said one direction and the tip of said tongue rides over said teeth until said pallet registers with a first newly selected space and the tip of said tongue enters a second newly selected space and engages a flank on one of said teeth, the tip of said tongue being moved away from the tip of said pallet and said tongue penetrating deeper into said second space in response to subsequent pivoting of said one member in said other direction whereby said pallet enters said first space to lock said one member against pivoting in said one direction.

3. An adjustable joint, comprising a first and a second member; pivot means connecting said members; a segmental ratchet rigid with said first member and comprising a plurality of teeth separated by tooth spaces; a pawl pivotally secured to said second member about one axis and including a pallet normally extending into one of said spaces to lock one of said members against pivoting in one direction; a control element pivotally mounted on said pawl about another axis for movement therewith and relative thereto and normally extending into another space adjacent to said one space; and resilient means for biasing said pallet and said element into the respective spaces, said pallet and said element being withdrawn from the respective spaces in response to pivoting of said one member in the other direction and said element riding over said teeth in response to subsequent pivoting of said one member in said one direction to locate a first newly selected space in registry with said pallet whereby said element partially extends into a second newly selected space and engages that tooth which separates said first and second spaces, said pallet and said element being compelled to enter said first and second spaces in response to subsequent pivoting of said one member in said other direction to thereby lock said one member against movement in said one direction.

4. An adjustable joint, comprising a first and a second member; pivot means connecting said members; a segmental ratchet rigid with said first member and comprising a plurality of teeth separated by tooth spaces; a first pawl pivotally secured to said second member about one axis and including a first pallet normally extending into one of said spaces to lock one of said members against pivoting in one direction; a second pawl pivotally mounted on said first pawl about another axis for movement therewith and relative thereto comprising a second pallet normally extending into another space adjacent to said one space; and resilient means for biasing said pallets into the respective spaces, said pallets being withdrawn from the respective spaces in response to pivoting of said one member in the other direction and said second pallet riding over said teeth in response to subsequent pivoting of said one member in said one direction to locate a first newly selected space in registry with said first pallet whereby said second pallet partially extends into a second newly selected space and engages that tooth which separates said first and second spaces, said pallets being compelled to enter said first and second spaces in response to subsequent pivoting of said one member in said other direction to thereby lock said one member against movement in said one direction.

5. An adjustable joint, comprising a first and a second member; pivot means connecting said members; a ratchet rigid with said first member and comprising a plurality of teeth separated by tooth spaces; a pawl pivotally secured to said second member and including a pallet having a tip normally extending into one of said spaces to lock one of said members against pivoting in one direction; a control element pivotally mounted on said pawl and having a tip normally extending into another space adjacent to said one space; and resilient means for biasing said pallet and said control element into the respective spaces and for biasing the tip of said control element toward the tip of said pallet so that said element pivots in response to pivoting of said one member in the other direction to withdraw said pallet from said one space, said element being longer than said pallet and riding over said teeth in response to subsequent pivoting of said one member in said one direction to locate a newly selected space in registry with said pallet whereby said element enters a second newly selected space and engages that tooth which separates said first and second spaces, said pallet and said element being compelled to enter fully said first and second spaces in response to such pivoting of said one member in said other direction that the tip of said element moves away from the tip of said pallet whereby said one member is locked against pivoting in said one direction.

6. An adjustable joint, comprising a first and a second member; pivot means connecting said members; a ratchet rigid with said first member and comprising a plurality of teeth separated by tooth spaces; a pawl pivotally secured to said second member and including a pallet having a tip normally extending into one of said spaces to lock one of said members against pivoting in one direction; a control element pivotally mounted on said pawl and having a tip normally extending into another space adjacent to said one space, said control element having a tip bounded by an arcuate cam face located at that side thereof which faces away from said pallet and said control element diminishing in width toward said tip thereof; and resilient means for biasing said pallet and said control element into the respective spaces and for biasing the tip of said control element toward the tip of said pallet so that said element pivots in response to pivoting of said one member in the other direction to withdraw said pallet from said one space, said element being longer than said pallet and said cam face riding over said teeth in response to subsequent pivoting of said one member in said one direction to locate a newly selected space in registry with said pallet whereby the tip of said element enters a second newly selected space and engages that tooth which separates said first and second spaces, said pallet and said element being compelled to enter fully said first and second spaces in response to such pivoting of said one member in said other direction that the tip of said element moves away from the tip of said pallet whereby said one member is locked against pivoting in said one direction.

7. An adjustable joint, comprising a first and a second member; pivot means connecting said members; a segmental ratchet rigid with said first member and comprising a plurality of teeth separated by tooth spaces; a first pawl pivotally secured to said second member and including a first pallet normally extending into one of said spaces to lock one of said members against pivoting in one direction; a second pawl pivotally mounted on said first pawl and having a second pallet normally extending into another space adjacent to said one space; and single resilient means for biasing said pallets into the respective spaces and for simultaneously biasing the tip of said second pallet toward the tip of said first pallet so that said second pallet pivots in response to pivoting of said one member in the other direction to withdraw said pallets from the respective spaces, said second pallet being longer than said first pallet and riding over said teeth in response to subsequent pivoting of said one member in said one direction to locate a first newly selected space in registry with said first pallet whereby said second pallet enters a second newly selected space and engages that tooth which is located between said first and second spaces, said pallets being compelled to enter fully said first and second spaces in response to such pivoting of said one member in said other direction which suffices to pivot the tip of the second pallet away from the tip of said first pallet to thereby lock said one member against pivoting in said one direction.

8. An adjustable joint as set forth in claim 7, wherein said resilient means comprises a leaf spring and wherein said second pawl comprises a flat portion which is in face-to-face abutment with said leaf spring when said second pallet is pivoted to move its tip toward the tip of said first pallet.

9. An adjustable joint, comprising a first and a second member; pivot means connecting said members; a ratchet rigid with said first member and comprising a plurality of teeth separated by tooth spaces; a pawl pivotally secured to said second member and including a pallet having a tip normally extending into one of said spaces to lock one of said members against pivoting in one direction; a control element pivotally mounted on said pawl and having a tip normally extending into another space adjacent to said one space, said control element comprising a projection which abuts against said pawl when said tips extend into the respective spaces; and resilient means for biasing said pallet and said control element into the respective spaces and for biasing the tip of said control element toward the tip of said pallet so that said element pivots in response to pivoting of said one member in the oher direction to withdraw said pallet from said one space whereby said projection is disengaged from said pawl, said element being longer than said pallet and riding over said teeth in response to subsequent pivoting of said one member in said one direction to locate a newly selected space in registry with said pallet whereby said element enters a second newly selected space and engages that tooth which separates said first and second spaces, said pallet and said element being compelled to enter fully said first and second spaces in response to such pivoting of said one member in said other direction that the tip of said element moves away from the tip of said pallet whereby said one member is locked against pivoting in said one direction.

10. An adjustable joint as set forth in claim 9, wherein said pawl comprises a pair of prongs, a median wall located between said prongs, and second pivot means securing said control element to said prongs, said projection being located intermediate said prongs and abutting against said median wall when the tip of said control element extends fully into a tooth space.

11. An adjustable joint as set forth in claim 10, wherein said pawl comprises a pair of outer walls disposed at the opposite sides of said median wall, each of said outer walls being integral with one of said prongs.

12. An adjustable joint as set forth in claim 10, wherein said median wall consists of rigid synthetic plastic material.

13. An adjustable joint as set forth in claim 10, wherein said second pivot means comprises a pin which is parallel with the pivot axes of said members and said pawl.

14. An adjustable joint, comprising a first and a second member; pivot means connecting said members; a ratchet rigid with said first member and including a plurality of teeth separated by tooth spaces; a pawl pivotally secured to said second member about one axis and including a pair of pallets normally extending into two adjoining spaces to lock one of said members against pivoting in one direction; a control element pivotally mounted on said pawl about another axis for movement therewith and relative thereto and normally extending into a further space adjacent to one of said adjoining spaces; and resilient means for biasing said pallets and said element into the respective spaces, said pallets and said element being withdrawn from the respective spaces in response to pivoting of said one member in the other direction and said element riding over said teeth in response to subsequent pivoting of said one member in said one direction to locate a pair of newly selected spaces in registry with said pallets whereby said element partially extends into a third newly selected space and engages that tooth which separates said third space from one of said pair of newly selected spaces, said pallets and said element being compelled to enter the respective newly selected spaces in response to subsequent pivoting of said one member in said other direction to lock said one member against movement in said one direction.

15. An adjustable joint, comprising a first and a second member; pivot means connecting said members; a ratchet rigid with said first member and having teeth separated by tooth spaces, said teeth forming a portion of a circle having its center on the axis of said pivot means; a pawl pivotally secured to said second member and having a pallet normally extending into one of said spaces to prevent pivotal movement of one of said members in one direction; a control element pivotally mounted on said pawl and normally extending into another tooth space, the pivot axes of said pawl and said control element being parallel with the axis of said pivot means; and resilient means mounted on said member for biasing said pallet and said control element into the respective spaces, said control element being arranged to ride over said teeth and to disengage said pallet from said ratchet in response to pivoting of said one member in the other direction and during subsequent pivoting of said one member in said one direction.

16. An adjustable joint as set forth in claim 15, wherein said pallet and said control element normally extend into a pair of adjoining tooth spaces and wherein said biasing means comprises spring means for urging said control element to pivot in said other direction with reference to said pawl when said pallet and said control element are fully received in the respective tooth spaces.

17. An adjustable joint, comprising a first and a second member, said members having pairs of apertured prongs and one pair of said prongs straddling the other pair; pivot means extending through said prongs and connecting said members; a ratchet rigid with said first member and having teeth separated by tooth spaces; a pawl pivotally secured to said second member and having a pallet normally extending into one of said spaces to prevent pivotal movement of one of said members in one direction; a control element pivotally mounted on said pawl and normally extending into another tooth space, the pivot axes of said pawl and said control element being parallel with the axis of said pivot means; and resilient means mounted on said second member for biasing said pallet and said control element into the respective spaces.

18. A joint as set forth in claim 17, wherein said ratchet is coplanar with said pawl and is located between said other pair of prongs.

19. A joint as set forth in claim 18, wherein said pawl comprises a bifurcated portion which straddles said control element.

References Cited
UNITED STATES PATENTS

| | | | |
|---|---|---|---|
| 619,180 | 2/1899 | Huttinger | 74—540 |
| 2,189,268 | 2/1940 | McCarthy | 74—577 X |
| 3,186,253 | 6/1965 | Ramillou | 74—540 |
| 3,232,136 | 2/1966 | Bahmuller | 74—533 |

FOREIGN PATENTS

| | | |
|---|---|---|
| 1,128,100 | 4/1962 | Germany. |

CARL W. TOMLIN, Primary Examiner.

A. V. KUNDRAT, Assistant Examiner.